P. H. HERNDON.
EGG TURNING DEVICE.
APPLICATION FILED APR. 3, 1911.

1,018,191.

Patented Feb. 20, 1912.

Inventor
PAUL H. HERNDON,

Witnesses
L. H. Schmidt
M. A. Bond

By E. H. Bond
Attorney

UNITED STATES PATENT OFFICE.

PAUL H. HERNDON, OF TAMPA, FLORIDA.

EGG-TURNING DEVICE.

1,018,191. Specification of Letters Patent. Patented Feb. 20, 1912.

Original application filed January 23, 1911, Serial No. 604,230. Divided and this application filed April 3, 1911. Serial No. 618,553.

*To all whom it may concern:*

Be it known that I, PAUL H. HERNDON, a citizen of the United States of America, and resident of Tampa, in the county of Hillsboro and State of Florida, have invented certain new and useful Improvements in Egg-Turning Devices, of which the following is a specification.

This invention relates to certain new and useful improvements in egg turning devices for use in incubators.

It has for its objects among others to provide a simple and cheap, yet efficient and reliable egg turning device whereby the eggs are supported upon a plurality of points and as the tray is pulled out, the supporting rollers are brought into contact with cams or the like whereby the rollers and, consequently, the eggs, are turned.

Other objects and advantages of the invention will hereinafter appear and the novel features thereof will be particularly pointed out in the appended claims.

The invention is clearly illustrated in the accompanying drawings, which, with the numerals of reference marked thereon, form a part of this specification, and in which—

Figure 1:
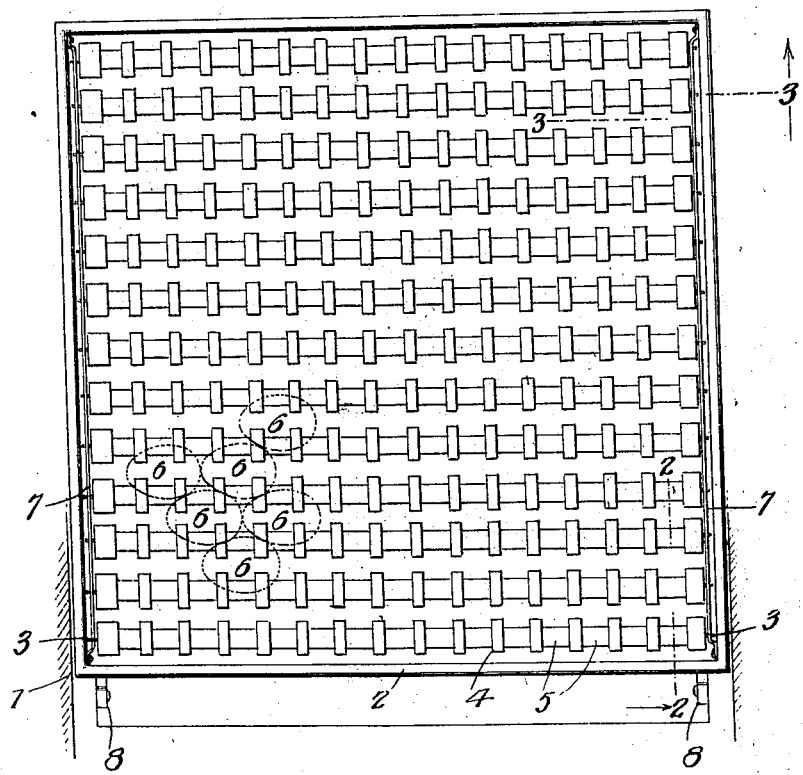
Figure 2:
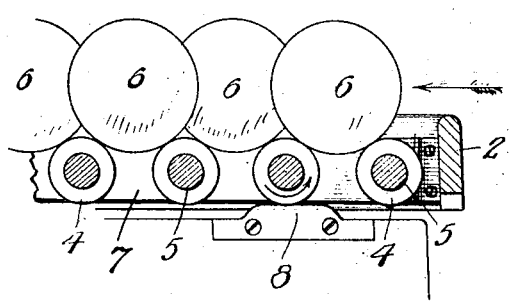
Figure 3:
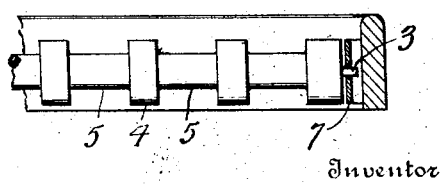

Figure 1 is a top plan view showing the egg supporting tray in its innermost position. Fig. 2 is an enlarged detail, partly in section and partly in elevation, of the egg tray and the means whereby the rollers and eggs are turned, the section being as on the line 2—2 of Fig. 1, looking in the direction of the arrow. Fig. 3 is an enlarged detail, partly in section, with portions broken away, showing one of the egg supporting rollers in position, the section being as on the line 3—3 of Fig. 1, looking in the direction of the arrow.

Like numerals of reference indicate like parts throughout the different views.

Referring to the drawings, 1 designates a portion of the egg chamber of an incubator. No more of the incubator is shown as the same is deemed unnecesasry for a proper understanding of the present invention and, furthermore, because the egg supporting and turning device forming the subject-matter of the present invention is capable of use in any and all forms of incubators, irrespective of the construction thereof aside from the parts forming the basis of this application.

2 is the egg tray embodying a frame in which are journaled upon suitable pintles 3, a plurality of rollers 4. Each of these rollers is provided with notches 5 at intervals, as seen best in Fig. 3, these notches provided with a plurality of bearing points for the eggs, each egg 6, as seen best in Figs. 1 and 2, having bearings upon two points of each two adjacent rollers. The pintles of the rollers in the present instance are mounted in the strips 7 secured to the side bars of the frame of the tray and offset therefrom, whereby the rollers are each mounted for independent movement and are out of contact with the sides of the frame of the tray. The tray is designed to be moved in and out of the egg chamber in any suitable manner, and as it is pulled outward, the end portions of the rollers engage upon an elevated or cam surface 8 at each side of the egg chamber, as seen clearly in Figs. 1 and 2, and by reason of such engagement, the rollers are given a half revolution, each set of eggs being in turn given a half revolution as the end portions of the rollers upon which they rest come in contact with the said cam members 8. As the tray is pushed back into the chamber, the front end is elevated, so as to bring the rollers out of contact with the cam portions, so as not to turn the eggs as the tray is pushed back into the chamber. When the tray is next pulled out, the eggs are given another half revolution.

It is to be understood that the cam surfaces 8 are disposed one at the front end of the chamber, as seen in Fig. 1, so that the rollers of the tray are normally out of engagement with such cam surfaces and each roller is only given a partial revolution as its end portions move over the said cam surfaces. It will thus be seen that the eggs are automatically turned by the withdrawal of the egg tray by which they are carried. The extent of the cam surface is substantially the same as one-half the circumference of the end portion of the roller which moves upon said cam surface, so that the roller is given but a half revolution, during the time it moves over the cam surface. When the roller has passed the cam surface, it is no longer revolving. Consequently, the amount of turning of the egg is determined by the length of the cam surface relatively to the circumference of the end portion of the roller.

While it is preferable that the eggs be turned as the tray is moved outward, it is evident that the eggs may be turned either in the outward or the inward movement of the tray, according to whether the tray is elevated so as to bring the rollers out of contact with the cam surfaces as the tray is moved out or in.

Modifications in details may be resorted to without departing from the spirit of the invention or sacrificing any of its advantages.

What is claimed as new is:—

1. In an incubator, an egg tray provided with rollers and stationary elevated means coöperating with said rollers for raising the tray and giving the eggs a partial revolution as the tray is moved in or out.

2. In an incubator, an egg tray provided with rollers and stationary cam means coöperating with said rollers for engagement by said rollers for giving the eggs a partial revolution and raising the tray as the tray is moved in or out.

3. In an incubator, an egg tray provided with a plurality of rollers notched to form a multiplicity of bearing points for the eggs, and stationary means for contact with said rollers to raise the latter as the tray is moved, to give the eggs a partial revolution.

4. In an incubator, an egg tray provided with a plurality of rollers notched to form a multiplicity of bearing points for the eggs, and stationary cam means for contact with said rollers to raise the latter as the tray is moved, to give the eggs a partial revolution.

5. In an incubator, an egg tray provided with a plurality of rollers notched to form a multiplicity of bearing points for the eggs, and cam means for direct contact with said rollers to raise the latter as the tray is moved, to give the eggs a partial revolution.

6. In an incubator, an egg tray provided with a plurality of rollers notched and having end portions, and stationary cam means coöperating with said end portions, the extent of operative surface of the cams being substantially equal to one-half the circumference of the end portions of the rollers.

Signed by me at Tampa Fla. this 31st day of March 1911.

PAUL H. HERNDON.

Witnesses:
W. H. JACKSON,
S. V. RAY.